July 14, 1931.  E. B. SMITH  1,813,969
METHOD AND APPARATUS FOR MEASURING SMALL TIME INTERVALS
Filed June 29, 1927   2 Sheets-Sheet 1

INVENTOR
EDMUND B. SMITH
By P. C. Smith
ATTORNEY

July 14, 1931.  E. B. SMITH  1,813,969
METHOD AND APPARATUS FOR MEASURING SMALL TIME INTERVALS
Filed June 29, 1927  2 Sheets-Sheet 2

INVENTOR:
EDMUND B. SMITH
BY P. E. Smith
ATTORNEY

Patented July 14, 1931

1,813,969

UNITED STATES PATENT OFFICE

EDMUND B. SMITH, OF NEW YORK, N. Y., ASSIGNOR TO BELL TELEPHONE LABORATORIES, INCORPORATED, OF NEW YORK, N. Y., A CORPORATION OF NEW YORK

METHOD AND APPARATUS FOR MEASURING SMALL TIME INTERVALS

Application filed June 29, 1927. Serial No. 202,278.

The present invention relates to a method and apparatus for measuring small time intervals and more particularly to the measuring of the time of operation of an electrical device such as a telephone relay.

In a telephone exchange system involving a large number of relays controlling complicated circuits, it is important that the relays operate or release within definite time intervals since failure to do so may make the entire system, or an important part thereof, inoperative to perform its functions.

Methods heretofore used in determining the time of operation of such relays involved sensitive, cumbersome apparatus such as the oscillograph. This instrument is suitable for use in the laboratory but is not suitable for routine testing or checking up on relays in the field because of the inconvenience met with in transporting it from office to office in the exchange. The present invention provides a method and apparatus capable of measuring small time intervals with reasonable degree of accuracy while both the apparatus of the test set and its methods of use are adapted for use employing only the ordinary facilities available at a telephone exchange.

The method proposed in the present invention involves the measurement of time intervals in terms of the number of reversals of current direction in an alternating current. This is done by counting and mechanically indicating the number of such reversals during the time interval to be measured. If the ordinary 60 cycle source of alternating current is utilized for this purpose, there will be 120 reversals per second and each reversal will be 1/120 of a second or .0083 second in duration. Sources either of a 20 cycle or 16-2/3 cycle alternating current are usually available at telephone exchanges and therefore it is preferred to use these sources thereby obtaining reversals at intervals of .025 and .030 second respectively.

Figure 1:
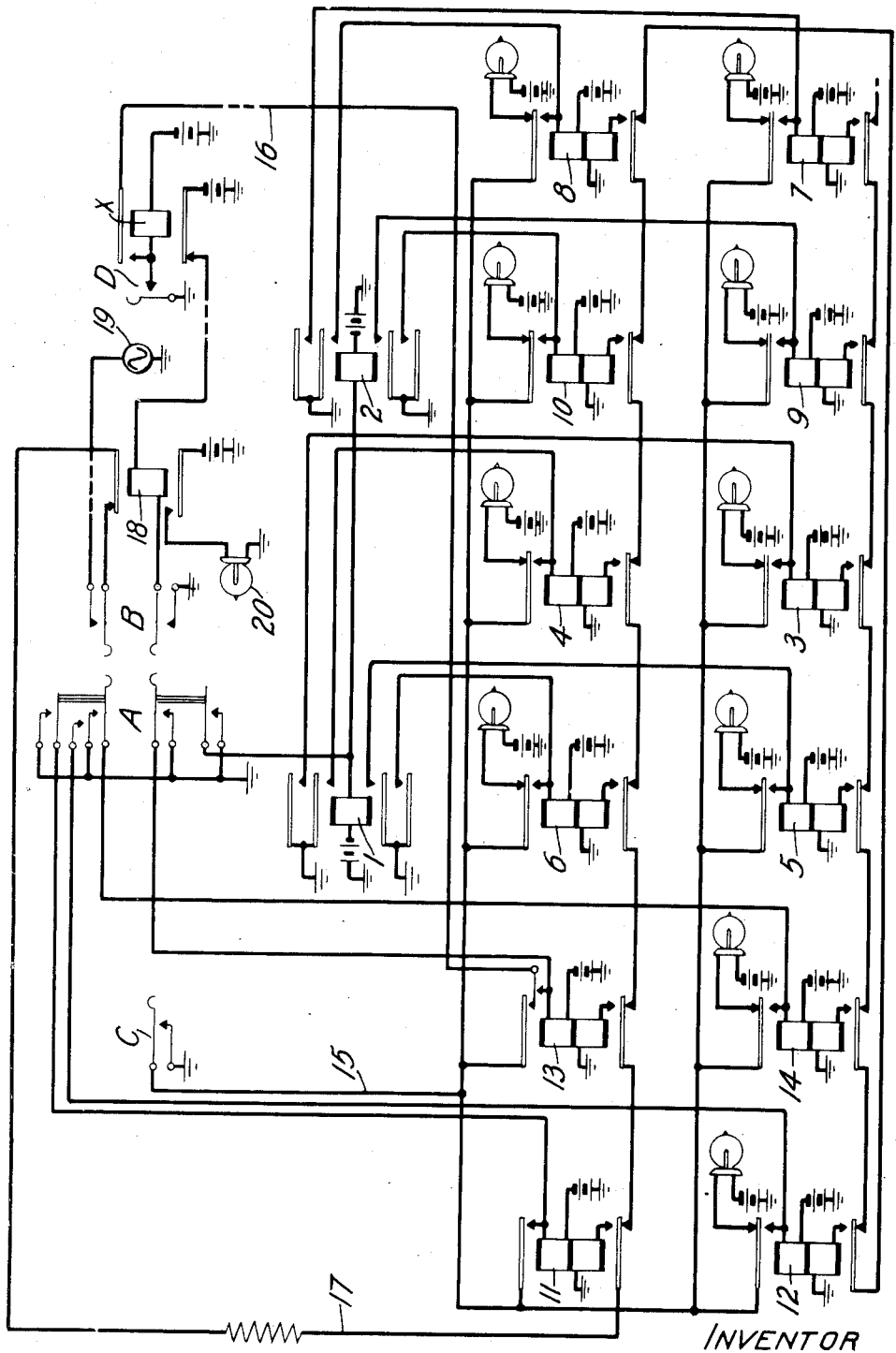
Figure 2:
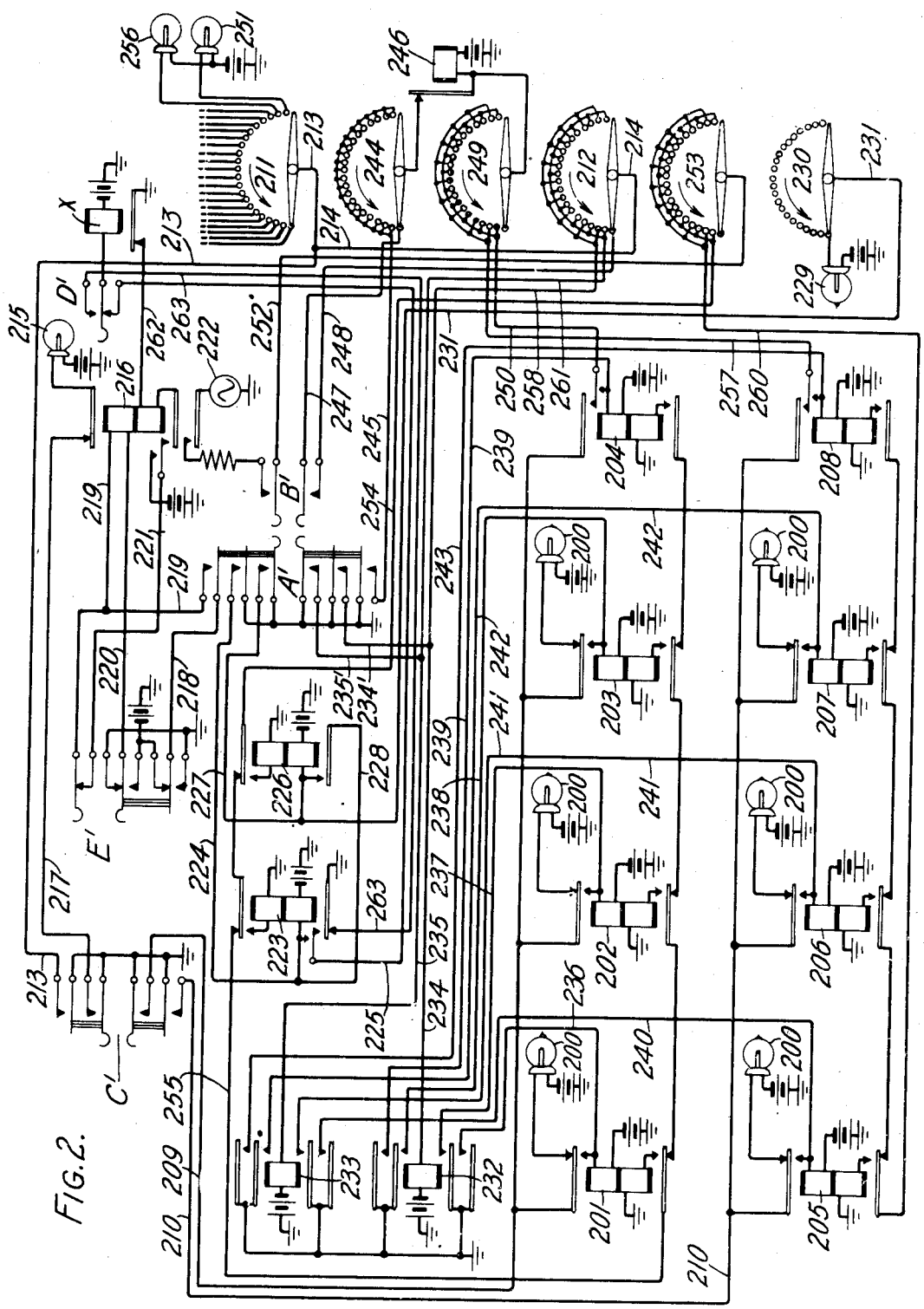

In the drawings Fig. 1 shows the structure of a simple test set connected to a relay under test and Fig. 2 shows such a set adapted to count time intervals with the assistance of a selector switch.

The invention in accordance with the embodiment illustrated by way of example in Fig. 1, functions as follows: A first switching means is actuated to operate a series of differential relays which lock over their upper armatures under the control of a second switching means. The first switching means is then opened and the relay to be tested is operated and locked over its upper armature. A third switch is then operated to connect a source of alternating current to a path leading successively to the lower windings of the differential relays. Each half wave of current being of opposite sign to that of the current in the upper winding of each differential relay releases the relay. The lower armature of each relay upon retracting connects the alternating current source to the next differential relay and so on through the series. The second relay of the series to release opens the circuit of the relay to be tested, which in turn actuates a relay to break the flow of alternating current to the series of differential relays. Each differential relay in the series after the second, upon releasing not only closes the path from the alternating current source to the next relay, but also lights a lamp. When the relay under test does release, and causes the opening of the alternating current circuit, a lamp is lighted to indicate the end of the test. The approximate time of release of a relay under test is determined by multiplying the known period of reversal of the alternating current by the number of lamps lighted through the armatures of the differential relays in the series.

The test set of Fig. 2 functions differently from that of Fig. 1 principally in counting in terms of groups of these differential relays, and lighting a counting lamp to indicate the number of groups that have released.

Suitable clip, clamp or jack and plug connections (not shown) may be arranged to quickly connect either test set to the source of power, to ground, and to relay under test.

It is believed that the invention will be best understood by a detailed consideration thereof in connection with the figures of the drawings. Reference will first be made to Fig. 1 which is a diagrammatic illustration of a relay test set embodying the invention. The set has a group of relays 3 to 14 which are differentially wound and are arranged to have their upper windings excited by battery current in such a manner that certain relays become positively polarized and others become negatively polarized. For example, alternate relays 11, 6, 10, 12, 5 and 9 may be positively polarized whereas the remaining relays 13, 4, 8, 14, 3 and 7 become negatively polarized.

It will be assumed that the relay X is the relay to be tested, and that the test is to determine the releasing time of such relay which is already installed and in use in the exchange.

In operation, the apparatus is placed in condition for making the measurement by operating first key A and then key C. Upon the operation of key A, relays 1 and 2 are operated over an obvious circuit as are also relays 11, 12, 13 and 14. Relays 3 and 4 are operated by obvious circuits over the upper armatures of relay 1; relays 5 and 6 by circuits over the lower armatures of the same relay. Relays 7 and 8 are operated by circuits over the upper armatures of relay 2 and relays 9 and 10 by circuits over the lower armatures of the same relay. All of the relays 3 to 14 will lock through their upper armatures and contacts to the conductor 15 leading to ground on operation of key C.

With the apparatus in this condition the key D is operated to operate relay X and is immediately released. Relay X is thereupon locked over its upper armature and contact, conductor 16 over the upper armature and contact of relay 13 to ground at key C. The lower armature in operating breaks a path from battery to the winding of a final relay 18. If key C is not operated, until after key D is operated, then a locking circuit for relay X will be found through contacts of key A.

With key C locked, key A is released and start key B is operated. Start key B connects, over its upper contact, a source of alternating current 19, over conductor 17 and the lower front contact of relay 11 to the lower winding of relay 11. Upon the first half of wave of current from source 19 of the proper polarity to oppose the flux set up by the upper winding thereof, the differentially wound relay 11 releases. The lower armature of relay 11 in retracting connects the alternating current source to the lower winding of relay 13 which releases on the next half wave.

Upon release of relay 13, the locking circuit for relay X is opened through the movement of the upper armature of relay 13 and relay X begins to release. Upon successive half waves from source 19 relays 6, 4, 10, 8, 12, 14, 5, 3, 9 and 7 will be released provided relay X has not completely released. Upon the complete release of relay X, however, a circuit is closed at its lower armature and back contact over the lower contact of key B to the winding of relay 18. The operation of relay 18 breaks the circuit from the source of alternating current over conductor 17 stopping the releasing of the train of relays. A lamp 20 lights over an obvious path through the lower armature of final relay 18 to indicate the end of the test.

The number of relays to be released in the series beginning with relay 6 will be determined by the elapse of time from the moment that relay X starts to release until the moment that relay 18 is energized, or, in other words, until the approximate moment relay X releases. Since relay 18 may be a relay having a very fast operating characteristic its operating time may be a negligible quantity so that the delay introduced between the time when relay X is fully released and the time the source 19 is disconnected need not be taken into consideration. If, for example, six half waves have taken place between the operation of relay 13 and consequent start of the release of relay X and the complete release of relay X, then relays 6, 4, 10, 8, 12 and 14 will have been released. Each of these relays upon releasing closes a circuit for a lamp signal individual to it which may be traced in each case from battery, through the lamp, back contact and upper armature of the particular relay, conductor 15 to ground at key C. The number of lighted lamps will indicate to the tester the number of half waves which have occurred during the release of the relay under test and consequently the time interval of such release. After observing the signal of the lamp operated by relay 18, the tester restores the keys B and C to normal and the apparatus is ready for another test.

It will be obvious that with a slight rearrangement of the connections this relay test set may be adapted to measure the time of operation of a relay as well as the time of release of the relay.

It will be seen that the embodiment of my invention diagrammatically illustrated in Fig. 2 records the release of the counting relays in multiples as well as individually. The fundamental principles of counting time intervals or measuring time intervals through the release by an alternating current of a series of alternately, oppositely polarized locked differential relays, one relay at a time for each half wave of alternating current, are the same as hereinbefore discussed in connection with the embodiment of the invention disclosed in Fig. 1.

In the test set of Fig. 2 the counting relays are arranged in groups electrically associated in such a manner that as the last relay of each individual group of relays releases it steps a selector switch. The selector in stepping closes the circuit from the alternating current source to the first relay of the next succeeding group of differential relays. The selector records the number of groups that have released by lighting one of a series of lamps at the start of the releasing of each group and by extinguishing a lamp at the closing of the release of each group. The selector switch moving to a new position or contact operates and locks the relays in the group just released making possible the use of each group an indefinite number of times in the counting operation. A final relay opens the alternating current circuit at the end of the time interval measured just as in the case of the test set of Fig. 1.

The apparatus or test set of Fig. 2 is placed in condition for a test by manipulation of key switches corresponding closely in function to those in the set of Fig. 1. For simplicity the reference letters for the keys of this set are applied similarly to indicate keys corresponding somewhat in function to correspondingly marked keys in the set of Fig. 1.

Key C' or key A' may be set first. Key C' is a locking key and on operation furnishes ground to light the lamps 200 for the group of differential counting relays 201 to 203, from battery over conductor 209 and a lower contact of the key C'. It also lights lamps 200 for the group of differential relays 205 to 207, from battery over conductor 210 and the lowest contact of key C' to ground. The key C' also furnishes ground to the brushes of the banks 211 and 212 of the selector switch over the conductors 213 and 214 and the uppermost of the contacts of the key C'. The key also furnishes ground over an upper contact to light the final lamp 215 over the upper armature of the final relay 216 and conductor 217.

Key A' is a non-locking, reset key to place relays, lamps and selectors in position or condition to start a test. With key C' set and locked, key A' upon its operation operates the final relay 216 over its upper winding from battery at key E' over an obvious circuit including conductor 218, the uppermost contact of key A' and conductors 219 and 220 to ground at key E'. The final relay operating opens the circuit through its upper armature and back contact, extinguishing the final lamp 215. The inner lower armature of the final relay closes a holding circuit for the relay from battery through its inner lower contact, conductor 221, upper normal contact of key E', conductor 219, upper winding of relay 216, conductor 220 to ground at key E'. The relay 216 at its lowermost front contact, closes a portion of a circuit from a source 222 of alternating current, extending to the uppermost contact of the starting key B', which is not yet operated.

The middle upper contact of the key A' grounds and operates the relay 223 over its lower winding and conductor 224, and the relay locks to ground over its lower front contact. With keys D' and E' unoperated the relay 223 operates relay X, under test, in a circuit from battery through the winding of relay X, the normal contact of key D', conductor 225 and the lower front contact of relay 223 to ground.

At its innermost upper contacts key A' grounds the lower winding of relay 226, over conductor 227, and the relay is held operated over its own lower armature, conductor 228, and the lower front contacts of relay 223. The start lamp 229 is now lighted from battery over the normal contact and brush of the bank 230 of the selector, the conductor 231, lower front contact of relay 226, conductor 228, over the front contacts of relay 223 to ground. The lighting of this lamp indicates that the set is ready for test.

The middle of the lower contacts of key A' grounds and operates relay 232 over a conductor 234, and a conductor 234'. The uppermost of the lower contacts of key A' grounds and operates relay 233 over conductors 235 and 235'. Relay 232 operates the first group of differential counting relays 201 to 204 over conductors 236, 237, 238 and 239 respectively each of which is grounded on a front contact of one of the armatures of the relay 232. Each of these relays locks over its upper armature and conductor 209 to ground at key C'. Relay 233 operates the second group of differential counting relays 205 to 208 over conductors 240 to 243 respectively to ground on the front contacts of the armatures of the relay 233. The relays 205 to 208 lock over conductor 210, and the lowest contact of key C' to ground. The lamps 200 connected with the differential counting relays are each extinguished by the operation of the particular controlling relay.

The lowest contact of key A' grounds all the bank terminals of the selector on its bank 244, over conductor 245. The selector switch, if not normal, steps to normal, lighting the start lamp 229 over the path previously noted. The set is now ready for test and it will be apparent that the start lamp, lighting as it does through the selector at normal and the front contacts of the two starting relays 223 and 226 can not be lighted unless the set is ready for test.

Key A' is now released and starting key B' is operated and locked. The stepping magnet 246 of the selector is now operated from battery through its winding and normal contact, over the brush and normal contact of bank 244, conductor 247, lower contact of start key B', conductor 248, brush and normal contact of bank 212, conductors 214 and 213, to ground at the uppermost contact of key C'. The selector steps to position 1 where stepping magnet 246 is held operated over contact 1 of the bank 249 over the strappings of the bank, conductor 250, the front contact of the upper armature of the relay 204, conductor 209, to ground at key C'. The starting lamp 229 is now extinguished and lamp 251 of the group-counting lamps is lighted over contact 1 of bank 211, conductor 213, and the uppermost contact of key C'.

The upper contact of key B' completes the circuit path from the source 222 of alternating current, over conductor 252, to the brush of selector bank 253 in its first position over the first set of strappings of the bank to conductor 254, the upper armature and upper winding of relay 226, to ground, neutralizing and releasing the relay 226 when the source 222 generates a half wave of the proper polarity. The relay 226 in releasing breaks its holding ground through its lower armature. The upper armature in retracting extends the circuit for the alternating current over its back contact, over the upper armature and front contact and upper winding of relay 223 to ground, releasing relay 223 upon the succeeding half wave of opposite polarity from the source 222.

Relay 223 on releasing breaks its own holding circuit and the holding circuit for the relay X, initiating the release of the relay X under test. The upper armature of relay 223 in retracting, extends the alternating current circuit over its back contact, conductor 255 to the lower armature and winding of differential relay 201. The succeeding half wave of alternating current will cause the release of relay 201. The lower armature of relay 201 in retracting extends the alternating current circuit to the lower armature and winding of relay 202 causing its release on the succeeding half wave of opposite sign to that which released relay 201. Relay 203 is similarly released on the next half wave. The relays 201, 202 and 203 each light a lamp 200 from battery through a back contact of the upper armature of each, over conductor 209, and the lower contact of key C' to ground. Relay 204 is similarly released by alternating current and in releasing breaks at its upper contact the holding ground for the selector magnet 246, stepping the selector to position 2.

The selector in stepping extinguishes lamp 251 in the series of group-counting lamps and lights the next lamp 256. The selector switch magnet 246 now operates over the strappings of bank 249, conductor 257, front contact and upper armature of relay 208, conductor 210, to the lowest contact of key C' and ground, holding the selector magnet 246 operated. With the selector in position 2 a circuit is closed to reoperate relay 232, which relay released upon the opening of key A', from ground at key C', conductors 213 and 214, the connecting strappings of the bank 212, conductor 258, and conductor 234 to battery through the winding of relay 232. The operation of the relay 232 will again set the relays 201 to 204, extinguishing the three lamps 200, that were lighted on the release of the first three relays in the group. The second contact of bank 253 of the selector now extends the alternating current circuit from conductor 252, over the brush and second contact and strappings of the bank to conductor 260, and to the lower armature and winding of relay 205, and to ground causing its release on the next succeeding half wave from the source 222.

The lower armature of relay 205 in retracting extends the alternating circuit to the lower armature and lower winding of relay 206, releasing that relay on the next succeeding half wave. The upper armature of relay 205 on retracting lights the lamp 200 associated therewith over conductor 210 and the lower contact of key C'. Similarly each relay 206 and 207 on releasing lights a lamp 200 over its upper armature and back contact, and on the retraction of its lower armature extends the alternating current circuit to the next relay in the series.

Relay 208 on releasing opens the circuit of the selector magnet 246 above traced, and the magnet advances the selector switch to its third position, lighting the third group lamp through bank 211, and extinguishing lamp 256. The selector magnet is again operated over the upper armature and front contact of relay 204 over conductor 250 and the third position contact of bank 249. When the selector leaves position 2 relay 232 releases and a circuit is closed to reoperate relay 233 which released when key A' was opened, from battery, winding of relay 233, conductors 235 and 261, third position contact of bank 212 to ground at key C' over conductors 214 and 213. The operation of relay 233 reoperates the second group of counting relays 205 to 208 over conductors 240 to 243 inclusive and extinguishes their individual lamps. The alternating current circuit is now extended over the third contact of bank 253, conductor 254, upper back contacts of relays 226 and 223, conductor 255, to the lower armature and winding of relay 201.

The next half wave of alternating current succeeding the wave that released relay 208 will release relay 201 and the first group of counting relays again releases in the manner previously described, lighting the three lamps 200. After the release of relay 204, the selector steps to close the alternating current circuit to the next group of relays over its bank 253, to extinguish the group lamp lighted over bank 211, and to light the next later one in the series, to operate its magnet 246 over bank 249 and upper armature of relay 208, to again reset the first group of relays 201 to 204, extinguishing their lamps and to release relay 233.

The releasing of the individual counting relays and the recording of the number of groups of relays released proceeds until relay X is completely released.

On the release of relay X, its armature in retracting closes a circuit from ground over conductor 262 to the lower winding of the final relay 216, through its inner lower armature, front contact to battery, exciting the lower winding of the relay to oppose the upper winding, shunting the locking circuit on the upper winding, and releasing the final relay 216. The upper armature of final relay 216, on retracting, closes a circuit through its back contact, and over conductor 217 to light the final lamp 215. The lowest armature of the final relay in retracting breaks the alternating current circuit, stopping the action of the counting relays.

The total time consumed in the release of relay X is determined by multiplying the time of release of a group of relays or four half wave periods of the source 222, by the number of group lamps 251 etc. extinguished during the movement of the selector, and adding thereto the additional increment of time, obtained from a count of the extinguished lamps 200 associated with the groups of relays being released at the end of the test multiplied by the half wave period of the source 222.

When the operate time of relay X is to be tested, key D' and key E' are operated before setting key B' to start the test. Key E' opens the locking circuit for the upper winding of relay 216 and the relay is held operated through its lower winding from battery at its inner lower contact, lower armature, conductor 262, and contact of relay X.

At the start of the test, relays 226 and 223 are released by alternating current through their upper differential windings as before, and the time interval of the test is started by the lower armature of relay 223 retracting and operating relay X. The operating circuit extends from ground, over the lower armature and back contact of relay 223, conductor 263, upper contact of key D' and winding of relay X. Relay X in completely operating at the close of the time interval measured attracts its armature and breaks the circuit from ground through the lower winding, inner armature and contact of the final relay 216, causing its release. During the time that relay X is operating the groups of differential relays operate in the manner previously described. The final relay upon releasing opens the alternating current circuit over its lowest armature and lights the final lamp over its upper armature just as is in the test described above.

The lamps lighted by the selector bank 211 indicate time intervals in steps of approximately .100 seconds using 20 cycle alternating current and in steps of .12 seconds using 16-2/3 cycle alternating current. The lamps 200 in this set will indicate time intervals one-quarter as great, namely, .025 seconds and .030 seconds for the respective alternating currents referred to above.

After the final readings are made the reset key A' may be operated to step the selector back to normal through its bank 244. When the selector reaches normal, lamp 229 lights to indicate when it is in normal position. Keys B' and C' are then restored and all operated apparatus releases.

It will be apparent that the structure of either set is applicable to the measurement of a time interval lapse connected with the use or operation of any instrument or other device. It will be obvious that various changes may be made in the suggested structure of the test set of this invention and within the scope of this invention.

What is claimed is:

1. The method of measuring an interval of time consisting of oppositely and alternately polarizing a series of differential relays, connecting a source of alternating current successively to the idle windings of the relays, releasing a relay for each reversal of the current, and causing an indication of the number of relays so released, whereby such indication is a measure of the time interval.

2. The method of measuring an interval of time consisting of oppositely and alternately polarizing the relays of a plurality of groups of differential relays, connecting a source of alternating current successively to the idle winding of the relays, releasing a relay for each reversal of the current, causing an indication of the number of groups of relays which have been released, and causing an indication of the number of individual relays released in a group in which not all of the relays are released, whereby the combined indications are a measure for computing the time interval.

3. The method of testing a relay which includes the steps of causing the release of the relay, and separately recording each reversal from a source of alternating current between the moment of initiating the release of the relay and the moment of the complete release of the relay.

4. The method of testing the time of operation of a relay which includes the steps of oppositely and alternately polarizing a series of differential relays, connecting a source of alternating current successively to the idle windings of the relays to release them, actuating the relay under test upon the release of one of the relays, and counting the number of subsequent relays that release between the moment of initiation of the actuation of the relay under test and the complete actuation of said relay, whereby the approximate time of operation of the relay is determined by multiplying the counted number by the period of reversal of the current.

5. The method of testing the time of operation of a relay which includes the steps of oppositely and alternately polarizing a series of differential relays, connecting a source of alternating current successively to the idle windings of the relays to release them, and simultaneously initiating the release of the relay under test, and counting the number of differential relays which are released before the release of the relay to be tested is complete, whereby the count multiplied by the period of reversal of the alternating current is an approximate measure of the time of release of the relay under test.

6. A device for testing a relay comprising a series of differential relays, means for energizing and alternately polarizing said relays, a source of alternating current, means associated with the relay under test and with the differential relays to initiate the operation of the relay under test and to simultaneously connect said source for releasing the differential relays in succession, and switching means to stop the release of the differential relays upon the complete operation of the relay under test, whereby the number of relays released, multiplied by the period of reversal of the alternating current is an approximate measure of the time of operation of the relay under test.

7. A device for testing a relay including a series of differential relays, switching means to actuate and alternately polarize said relays, switching means to operate the relay under test, a source of alternating current, switching means to connect said source of alternating current to the idle windings of the differential relays in succession to cause their release, means controlled by the release of one of said relays to initiate the release of the relay under test, and means operable on the complete release of the relay under test to disconnect said source of alternating current, whereby the number of differential relays released subsequent to the release of said one relay is an approximate measure of the time of release of the relay under test.

8. A device for testing a relay including a series of differential relays, switching means to actuate and alternately polarize said relays, a source of alternating current, switching means to connect said source of alternating curent to the idle windings of said differential relays to cause the successive release thereof, means controlled by the release of one of said relays to initiate the energization of the relay under test, and means operable on the complete operation of said relay under test to disconnect said source of alternating current, whereby the number of differential relays released subsequent to the release of said one relay is an approximate measure of the time of operation of the relay under test.

9. A device for testing a relay including a series of differential relays, switching means to actuate and alternately polarize said relays, switching means to operate the relay under test, a source of alternating current, switching means to connect said source of alternating current to the idle windings of said differential relays to cause the successive release thereof, means controlled by the release of one of said relays to initiate the release of the relay under test, means operable on the complete release of the relay under test to disconnect the source of alternating current, and means to indicate the released condition of each differential relay, whereby the number of differential relays indicated to be released is an approximate measure of the time of operation of the relay under test.

10. A device for testing a relay including a series of differential relays, switching means to actuate and alternately polarize said relays, switching means to operate the relay under test, a source of alternating current, switching means to connect said source of alternating current to the idle windings of said differential relays to cause the successive release thereof, means controlled by the release of one of said relays to initiate the release of the relay under test, means operable on the complete release of the relay under test to disconnect said source of alternating current, a lamp associated with each differential relay and arranged to be lighted upon the release of the corresponding relay, whereby the number of lamps lighted is an approximate measure of the time of operation of the relay under test.

11. In combination in a test set for measuring a time interval, groups of differential relays, a relay for energizing and alternately polarizing the relays of each group, a source of alternating current, a relay for initiating the time interval to be measured and for connecting said source of alternating current through the first differential relay to release said relay, means controlled by each relay to extend the connection from said source through to the next succeeding relay in a group on the release of the preceding relay, means to extend the connection from said source through the first relay of a group on the release of the last relay of the preceding group, and means to indicate the number of groups released at the end of the time interval.

12. In combination in a test set for measuring a time interval, groups of differential relays, a relay for energizing and alternately polarizing the relays of each group, a source of alternating current, a relay for initiating the time interval to be measured and for connecting said source of alternating current through the first differential relay to release said relay, means controlled by each relay to extend the connection from said source through the next succeeding relay in a group on the release of the preceding relay, means to extend the connection from said source through the first relay of a group on the release of the last relay of the preceding group, means to disconnect the alternating current source at the end of the time interval to be measured, and means to indicate the number of groups of relays which have been released up to the end of the time interval to be measured.

13. In combination in a test set for measuring a time interval, groups of differential relays, a relay for energizing and alternately polarizing the relays of each group, a source of alternating current, a relay for initiating the time interval to be measured and for connecting said source of alternating current through the first differential relay to release said relay, means controlled by each relay to extend the connection from said source through the next succeeding relay in a group on the release of the preceding relay, means to extend the connection from said source through the first relay of a group on release of the last relay of the preceding group, means to disconnect the alternating current source at the end of the time interval to be measured, and means to indicate the number of groups and the number of individual relays which have been released up to the end of the time interval to be measured.

14. In a test set for measuring an interval of time, two groups of differential relays, means for energizing and oppositely polarizing said relays, a source of alternating current, means operative at the beginning of the interval to be measured to connect said source to the relays of one group to successively release them, means including a selector switch for thereafter alternately associating said groups of relays with said source and for reenergizing released groups of relays, means controlled by the release of the last relay in each group to advance said switch, means for disconnecting said source to arrest the release of further relays at the end of the interval to be measured, and means controlled by said switch to indicate the number of times said groups of relays have been released during the interval.

15. In a test set for measuring an interval of time, two groups of differential relays, means for energizing and oppositely polarizing said relays, a source of alternating current, means operative at the beginning of the interval to be measured to connect said source to the relays of one group to successively release them, means including a selector switch for thereafter alternately associating said groups of relays, with said source and for reenergizing released groups of relays, means controlled by the release of the last relay of each group to advance said switch, means for disconnecting said source to arrest the release of further relays at the end of the interval to be measured, means controlled by said switch to indicate the number of times said groups of relays have been released during the interval, and means to indicate the number of relays in the group last released which have been released at the end of the interval.

In witness whereof, I hereunto subscribe my name this 23 day of June A. D., 1927.

EDMUND B. SMITH.